Patented Nov. 18, 1952

2,618,657

UNITED STATES PATENT OFFICE 2,618,657

PROCESS OF PREPARING N-SUBSTITUTED DERIVATIVES OF AMINOPHENOLS

Remsen Stoddard Vaughn and Frederic R. Bean, Rochester, N. Y., assignors to Eastman Kodak Company, Rochester, N. Y., a corporation of New Jersey No Drawing. Application July 10, 1948, Serial No. 38,174

4 Claims. (Cl. 260—570.5)

This invention relates to a process of preparing N-substituted derivatives of aminophenols, and to some of the products of this process. One object of our invention is to provide a process of preparing N-substituted aminophenols. Another object is to provide certain novel N-substituted aminophenols. Our novel process consists in refluxing bromophenol with an alkylene polyamine, a primary alkanolamine, or an N-alkanol alkylene polyamine in an aqueous medium. In most cases it is necessary to use a catalyst. We have found that copper and its salts give good results for this purpose. We tried many other metals and their salts as catalysts, without success.

Isolation of the products is accomplished by acidification of the reaction mixture with a mineral acid, followed by evaporation and concentration of the solution to a point where separation of the mineral acid salt of the N-substituted derivative of the aminophenol takes place. The free base can be prepared from the salt by treating with an alkali in aqueous solution.

Our process is advantageous in that no high-pressure equipment is necessary.

By way of illustrating the carrying out of our process, we give the following examples:

Example I.—N-β-Aminoethyl p-aminophenol

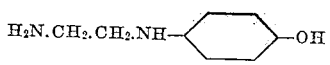

35 g. of p-bromophenol, 40 g. of 60% ethylene diamine, 2 g. of CuSO$_4$.5H$_2$O, and 100 cc. of water were refluxed together for 6 hours. The resulting mixture was acidified with dilute sulfuric acid and char-filtered at the boiling point. The filtrate was evaporated until it deposited crystals readily at 0° C. The product, the salt of N-β-aminoethyl p-aminophenol with one molecule of H$_2$SO$_4$, was filtered off and washed with alcohol. Yield: 41 grams of the sulfuric acid salt of the base. M. P. 279–280° C. with decomposition.

| Analysis | Calculated | Found |
|---|---|---|
| C | 38.4 | 38.49 |
| H | 5.6 | 5.53 |
| N | 11.2 | 10.96 |

Example II.—N-β-Aminopropyl p-aminophenol

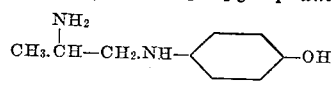

The procedure was the same as in Example I, 35 g. of p-bromophenol, 30 g. of propylene diamine, 2 g. of CuSO$_4$.5H$_2$O and 100 cc. of water being used. The product was recrystallized from water. Yield: 31 g. of the sulfuric acid salt of the base. M. P. 263–264° C. with decomposition.

| Analysis | Calculated | Found |
|---|---|---|
| C | 40.9 | 40.87 |
| H | 6.06 | 5.96 |
| N | 10.6 | 10.58 |

Example III.—N-β-Hydroxyethyl p-aminophenol

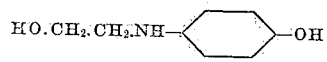

The procedure was the same as in Example I, 35 g. of p-bromophenol, 25 g. of ethanolamine, 2 g. of CuSO$_4$.5H$_2$O and 100 cc. of water being used. The melting point of the product was 185–187° C. The identity of this compound was checked by preparing N-β-hydroxyethyl p-aminophenol sulfate by the known method of reacting p-aminophenol and ethylene chlorohydrin, as described in U. S. Patent 1,712,716 of Reddelien and Mueller, and comparing the melting points. The product prepared by the method of Reddelien and Mueller melted at 187° C.

Example IV.—N-β-Aminoethyl o-aminophenol

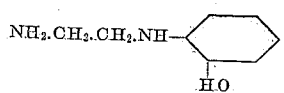

The procedure was the same as in Example I, 8.65 g. of o-bromophenol, 20 g. of 60% ethylene diamine, 1 g. of CuSO$_4$.5H$_2$O and 50 cc. of water being used. The sulfuric acid salt was recrystallized from water. Yield: 6½ g. of the sulfuric acid salt of the base. M. P. 253–254° C. N-β-aminoethyl o-aminophenol and its sulfuric acid salt are described in Beilstein 13, 380.

Example V.—N-β-(β'-Hydroxyethylamino)-ethyl p-aminophenol

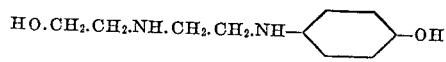

The procedure was the same as in Example I, 43 g. of p-bromophenol, 58 g. of hydroxyethyl ethylene diamine, 1 g. of CuSO$_4$.5H$_2$O and 100 cc. of water being used. The product was recrystallized from water. Yield: 44 g. of the sulfuric acid salt of the base. M. P. 240–241° C. with decomposition.

| Analysis | Calculated | Found |
|---|---|---|
| C | 40.87 | 41.38 |
| H | 6.12 | 6.25 |
| N | 9.52 | 9.35 |

*Example VI.—N-β-(β'-aminoethylamino)-ethyl-p-aminophenol*

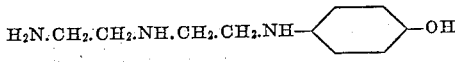

The procedure was the same as in Example I, 35 g. of p-bromophenol, 45 g. of diethylene triamine, 1 g. of CuSO$_4$.5H$_2$O and 100 cc. of water being used. The sulfuric acid salt formed contained 3 molecules of sulfuric acid per 2 molecules of the base. Melting point of the salt: 262–263° C. with decomposiiton.

In the case of the amines containing both primary and secondary amino groups, the analytical data do not indicate conclusively which amino group reacts with the bromophenol. However, attempts to react p-bromophenol with secondary amines were not successful under the comparatively mild reaction conditions used in the process of our invention, so that it is reasonable to assume that the bromophenols react only with primary amino groups in the examples given above.

The N-substituted derivatives of aminophenols whose preparation we have described are useful as photographic developers, especially in concentrated and fine-grain formulae. They are also useful as dye intermediates and antioxidants for materials which tend to undergo deterioration owing to oxidation, e. g. hydrocarbon motor fuels, rubber, fats, oils, essential oils, etc.

In addition to the compounds shown in the above examples, we believe that we have prepared the compound

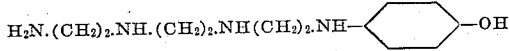

from triethylenetetramine and p-bromophenol, and the compound

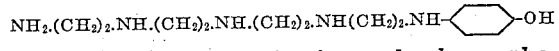

from tetraethylene pentamine and p-bromophenol. These products were not isolated because of the great water solubility of their sulfuric acid salts. However, their presence was evidenced by the fact that the mixtures resulting from the reaction were found to be very active as photographic developers, whereas none of the starting materials is a photographic developer.

We have also prepared the compounds N-(β-aminoethyl)-4-amino-2-chlorophenol and N-(β-aminopropyl)-4-amino-2-chlorophenol from 2-chloro-4-bromophenol and the alkylene diamines ethylene diamine and propylene diamine, respectively.

What we claim as our invention and desire to be secured by Letters Patent of the United States is:

1. A process for preparing an N-substituted derivative of an aminophenol which comprises refluxing together, in the presence of copper sulfate as a catalyst, a mononuclear monohydric monobromophenol and a compound selected from the group consisting of the lower alkylene polyamines, the lower primary alkanolamines and the lower N-alkanol alkylene polyamines.

2. A compound represented by the structural formula

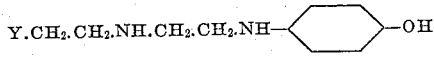

in which Y is a grouping selected from the group consisting of NH$_2$ and OH.

3. N-β-(β'-hydroxyethylamino)-ethyl p-aminophenol.

4. N-β-(β'-aminoethylamino)-ethyl-p-aminophenol.

REMSEN STODDARD VAUGHN.
FREDERIC R. BEAN.

REFERENCES CITED

The following references are of record in the file of this patent:

UNITED STATES PATENTS

| Number | Name | Date |
| --- | --- | --- |
| 1,757,394 | Schulemann et al. | May 6, 1930 |
| 1,841,674 | Ruitelman et al. | Jan. 19, 1932 |
| 2,129,525 | Clifford | Sept. 6, 1938 |
| 2,256,806 | Kern | Sept. 23, 1941 |

FOREIGN PATENTS

| Number | Country | Date |
| --- | --- | --- |
| 249,717 | Great Britain | Apr. 1, 1926 |
| 302,984 | Great Britain | Dec. 24, 1926 |
| 8,712 | Australia | Aug. 8, 1927 |
| 131,250 | Switzerland | Jan. 31, 1929 |
| 22,101 | Netherlands | June 16, 1930 |
| 22,184 | Netherlands | July 15, 1930 |
| 514,747 | Germany | Dec. 18, 1930 |
| 538,456 | Germany | Nov. 13, 1931 |
| 432,480 | Great Britain | July 22, 1935 |

OTHER REFERENCES

Degering: "Organic Nitrogen Cpds.," (Univ. Litho, Ypsilanti, Mich., 1945), p. 301.